July 29, 1952     L. T. DAIGLE     2,604,974
TROLLEY FOR TRANSPORTATION OF A LOAD ALONG A BEAM
Filed April 19, 1949
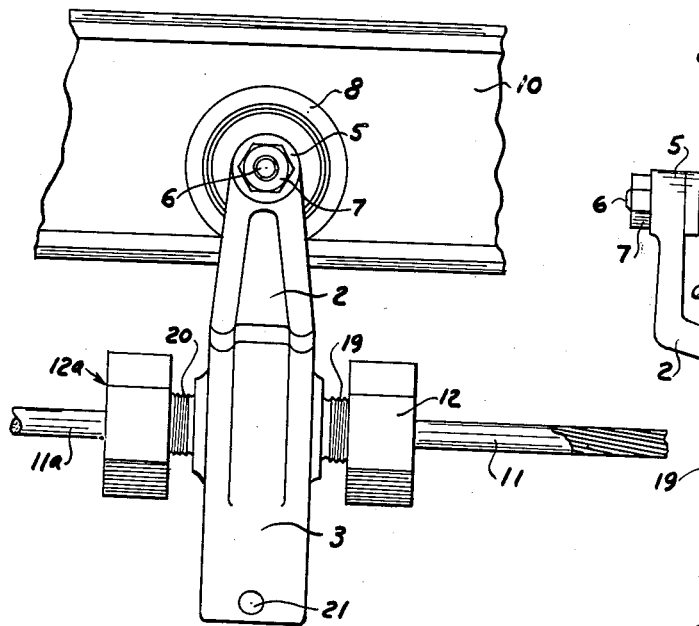
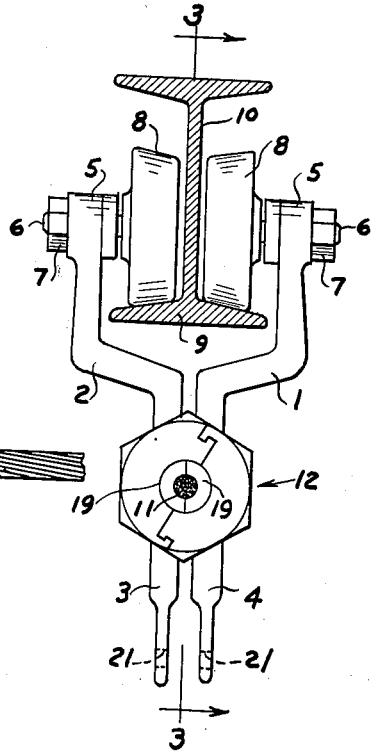
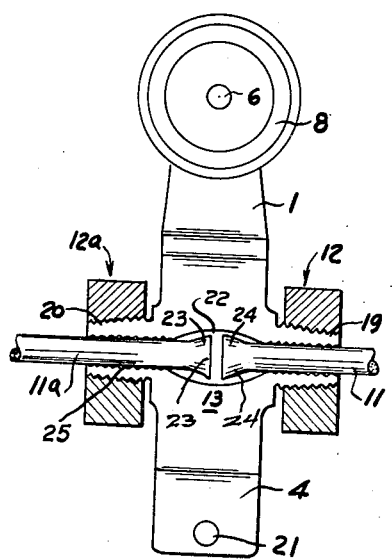
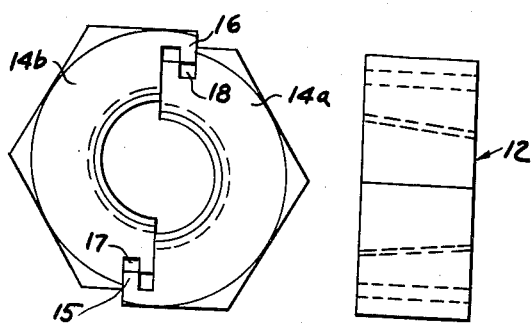
INVENTOR.
LEO T. DAIGLE.
BY
ATTORNEY.

Patented July 29, 1952

2,604,974

UNITED STATES PATENT OFFICE 2,604,974

TROLLEY FOR TRANSPORTATION OF A LOAD ALONG A BEAM

Leo T. Daigle, Detroit, Mich., assignor, by direct and mesne assignments, to Daigle-Gaboury Inc., Detroit, Mich., a corporation of Michigan Application April 19, 1949, Serial No. 88,280

5 Claims. (Cl. 198—177)

This invention relates to a trolley for transporting a load along an overhead rail by means of a cable, the object being to provide a device of such character and structural relationship of parts as to enable the same to be positioned on the flange of the rail and separable parts for securing the same to a cable.

These and other features and objects of the invention are hereinafter more fully described and claimed and the preferred form of a device embodying my invention is shown in the accompanying drawing in which—

Fig. 1 is a side elevation of the device showing its position on a rail.

Fig. 2 is a side view of the device when on the rail.

Fig. 3 is a section taken on line 3—3 of Fig. 2.

Fig. 4 is an elevation of a special form of nut for clamping the cable to the device.

Fig. 5 is a side view of the nut.

The device in its preferred form comprises a pair of arms 1 and 2 having parallel portions 3 and 4 and the upper end 5 of each arm is formed with an eye to receive a shaft 6 and a nut 7 is provided for each shaft. On each shaft is a roller 8 the peripheral surface of which is at an angle to the shaft axis corresponding to the angle of the upper surface of the lower flange 9 of the rail 10. The end portions 11 and 11a of the cable extend through the nuts 12 and 12a and into an aperture 13 as shown in Fig. 3. Each of the nuts 12 and 12a are formed of two separable parts 14a and 14b as shown in Fig. 4.

The half portion 14a of the nut has a flange 15 and the half portion 14b of the nut has a similar flange 16 and these flanges respectively engage in the slots 17 and 18. By this arrangement the two half parts of the nut may be separated and positioned on the threaded portions 19 and 20. With the portions 14a and 14b of the nut in the position shown in Fig. 4 the two parts thereof may be separated to permit placing the same on the cable and then moved to the position shown in Fig. 2 and threaded on the respective outwardly extending threaded lugs 19 and 20 as indicated in Fig. 3. Each of the parallel portions 3 and 4 of the respective arms have similar lugs.

By the described arrangement of parts the elements 1 and 2 and the rollers thereon are positioned on the lower flange of the rail and the respective arms 3 and 4 secured together by the nuts 12 and 12a. As previously stated each of the nuts 12 and 12a are separable and each part may be placed on opposite sides of the cable and then moved to the relationship shown in Fig. 4 and the flanges 15 and 16 positioned in the recesses 17 and 18 thereby positioning the half circular portions in alignment and the nuts 12 and 12a are then screwed on the threaded portions 19 and 20 of each of the arms which have the shape of a truncated cone and thus when the nuts are threaded thereon the two half parts 1 and 2 are secured in the position shown in Fig. 2.

The lower ends of the arms 3 and 4 are here shown as having an aperture 21 through which a wire or other convenient element may be positioned and attached to a load. It will be understood however that other means may be provided for securing a load to the device without departing from the spirit and scope of the invention herein disclosed.

When the opposed ends of a cable are required to be connected it is desirable to fuse the ends together. The opposed ends of the wire are therefore flared out at 23 and 24 so they can not be pulled from the recess 22 and when fused together the cable ends can not be pulled through the opening after the nuts 12 and 12a are securely tightened on the complemental pairs of one-half circular members 19 and 20. The device may be used on a cable at any point.

It is further to be noted that the externally threaded portions 19 and 20 have an internal thread 25 that engages the strands of the cable when the nut is tightened thus preventing the hanger from sliding on the cable.

The threaded members 19 and 20 project laterally from opposite sides of the arms 1 and 2 each of the members 19 and 20 being of one-half circular shape and adapted for registry with a corresponding complemental one-half circular portion 19 and 20 similarly extending from the opposed arm 2. The complemental threaded portion 19 of the arms 1 and 2 forms a single tapered and threaded lug which is adapted to receive the threaded nut 12, and likewise the complemental one-half circular tapered threaded portions 20 of the arms 1 and 2 form a second lug to receive the other nut 12a. The inner portions of the threaded members 19 and 20 have a threaded recess within which the cable ends 11 and 11a extend whereby tightening of the nuts 12 and 12a brings the interior threaded portion 25 into tight gripping engagement with said cable ends.

It is believed obvious from the foregoing description that the various objects and features of the invention are attained by the structural character and relationship of parts as hereinbefore described.

Having thus briefly described my invention, its utility and mode of operation, what I claim and desire to secure by Letters Patent of the United States is:

1. A trolley for supporting a load along a flanged beam, the trolley comprising a pair of arms oppositely arranged from each other, an inwardly extending shaft at the upper ends of said arms, a roller journaled upon each shaft, the rollers respectively engaging the flanges on opposite sides of the beam, each of the arms having a pair of aligned oppositely arranged laterally extending half-circular threaded portions at right angles to said arms which are tapered and of greater diameter adjacent the respective arms, and having opposed slotted portions to retainingly receive a longitudinally movable cable, a nut for each of the corresponding threaded portions, each nut consisting of a pair of symmetrical separable parts so formed as to inter-lockingly engage each other to form a unitary self-locking nut when introduced over the cable and threaded upon said threaded portions.

2. A trolley for supporting a load for movement along a flanged beam comprising a pair of oppositely arranged arms, an inwardly positioned roller journaled upon the upper end of each of said arms and mounted upon the said beam, each of said arms having intermediate its ends a pair of aligned oppositely extending outwardly projected tapered half-circular threaded portions at right angles to said arms which are centrally grooved to receive portions of a longitudinally movable cable, the complemental threaded portions constituting a lug for receiving a nut, a nut on each of the lugs formed by said complemental portions, each nut consisting of a pair of symmetrical separable parts so formed as to inter-lockingly engage each other to form a unitary self-locking nut when introduced over the cable and threaded upon said threaded portions, whereby the turning of the nuts inwardly of said complemental tapered portions pressure is exerted on the cable for securing the same to said arms.

3. A trolley for transporting a load along a flanged beam comprising a pair of upright oppositely arranged arms, an inwardly positioned roller journaled upon the upper end of each arm and riding upon the flanges of said beam, each of said arms having intermediate its ends a pair of aligned oppositely arranged laterally extending half-circular threaded portions at right angles to said arms upon each side thereof and having central elongated grooves therein to retainingly receive portions of a longitudinally movable cable, a nut on each of said complemental threaded portions, each nut consisting of a pair of symmetrical separable parts so formed as to inter-lockingly engage each other to form a unitary self-locking nut when introduced over the cable and threaded upon said threaded portions.

4. A trolley for transporting a load along a flanged beam comprising a pair of rollers positioned upon the flanges of said beam, means supported by said rollers comprising depending arms for each roller upon which the latter is journaled, means for attaching a portion of a longitudinally movable cable to each arm, including a nut, the arms each having intermediate their ends a laterally extending complemental half-circular threaded portion at right angles to said arms, centrally grooved to retainingly receive a cable, and when assembled forming a threaded tapered lug, upon which said nut is positioned, each nut consisting of a pair of symmetrical separable parts so formed as to inter-lockingly engage each other to form a unitary self-locking nut when introduced over the cable and threaded upon said lug.

5. In a trolley for transporting a load, a pair of upright oppositely arranged arms, each of said arms having intermediate its ends a pair of aligned oppositely arranged laterally extending half-circular tapered threaded portions at right angles to said arms, upon each side thereof and having central elongated threaded grooves therein to retainingly receive and grip portions of a longitudinally movable cable, and correspondingly tapered threaded nuts loosely mounted over said cable and positioned upon said complemental threaded portions for securing said arms to said cable.

LEO T. DAIGLE.

REFERENCES CITED

The following references are of record in the file of this patent:

UNITED STATES PATENTS

| Number | Name | Date |
|---|---|---|
| 1,797,194 | Knapp | Mar. 17, 1931 |
| 1,804,923 | Fernekes et al. | May 12, 1931 |
| 2,095,022 | Bishop | Oct. 5, 1937 |
| 2,147,199 | Hapman | Feb. 14, 1939 |
| 2,225,169 | Gallagher | Dec. 17, 1940 |